Oct. 23, 1951 L. M. KAY 2,572,157

COMBINATION RADIO-WIRE RECORDER

Filed Dec. 31, 1947 2 SHEETS—SHEET 1

INVENTOR.

LEOPOLD M. KAY

BY

[signature]

ATTORNEY

Oct. 23, 1951 L. M. KAY 2,572,157

COMBINATION RADIO-WIRE RECORDER

Filed Dec. 31, 1947 2 SHEETS—SHEET 2

INVENTOR.

LEOPOLD M. KAY

BY

ATTORNEY

Patented Oct. 23, 1951

2,572,157

UNITED STATES PATENT OFFICE 2,572,157

COMBINATION RADIO-WIRE RECORDER

Leopold M. Kay, New York, N. Y., assignor to Air King Products Co. Inc., Brooklyn, N. Y., a corporation of New York Application December 31, 1947, Serial No. 794,941

5 Claims. (Cl. 179—100.11)

This invention relates to radio wire recorders.

It is a principal object of the invention to provide as a single unit a radio and a wire recorder for the radio.

It is another object of the invention to provide a unit of the character described in which the recorder employs a high frequency bias oscillator.

It is an additional object of the invention to provide a radio in combination with a wire recorder and loud speaker, and with other equipment such as a microphone and/or disc record player, all of which are consolidated as a single unit together with selective means to permit recording from the radio, microphone or record player on the wire recorder, or effective action at listening level of the loud speaker from the radio, record player or wire recorder.

Other objects of the invention will in part be obvious and in part be pointed out hereinafter.

The invention accordingly consists in the features of construction, combinations of elements, and arrangements of parts which will be exemplified in the construction hereinafter described, and of which the scope of application will be indicated in the appended claims.

In the accompanying drawings in which is shown one of the various possible embodiments of the invention:

Figures 1, 2:
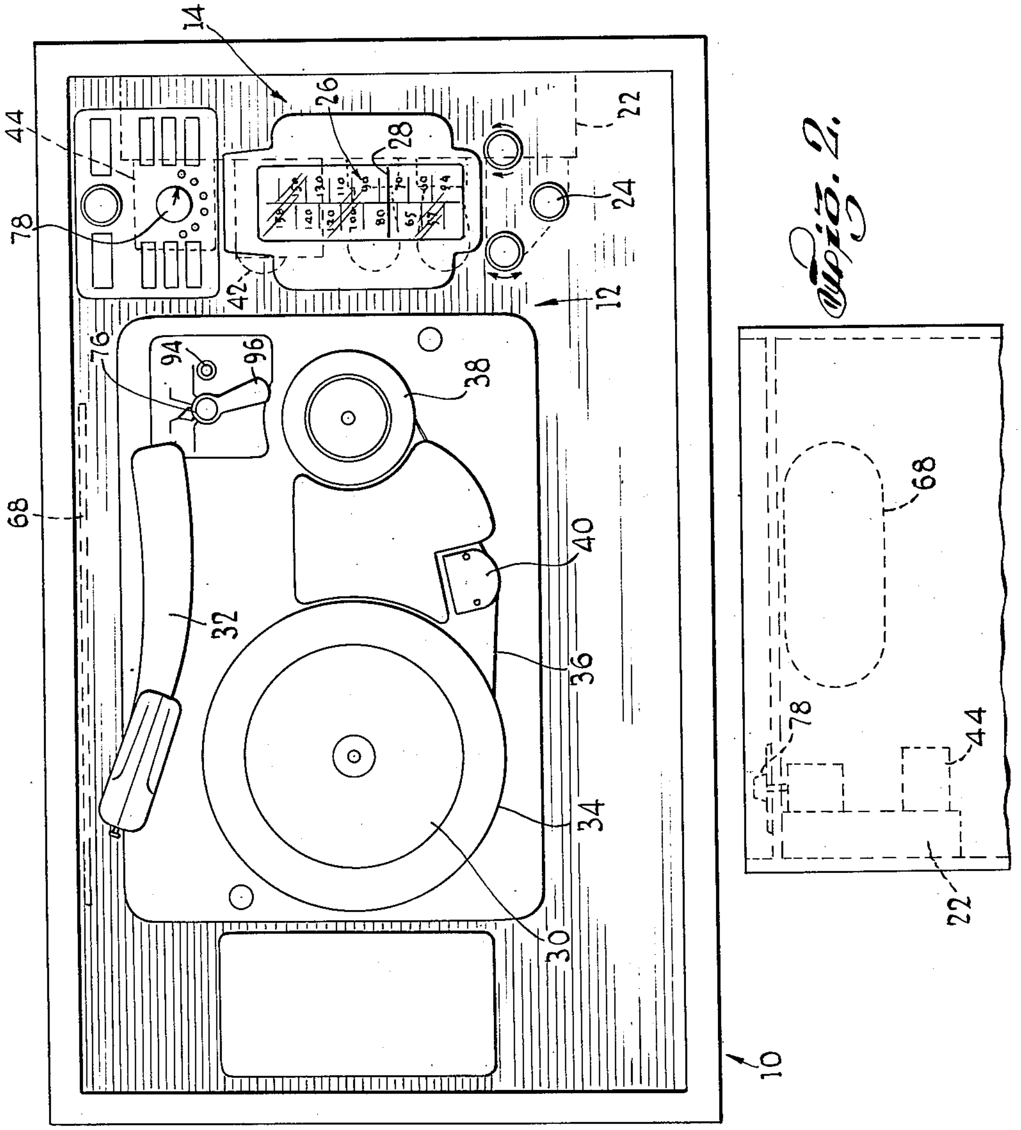
Fig. 1 is a top view of the radio wire recorder.
Fig. 2 is a reduced fragmentary back view thereof.

It is well known that wire recorders are subject to hysteresis distortion and that such distortion can be overcome by adding a high frequency magnetic field to the signal field at the recording point. A field of this character conventionally is produced by a high frequency oscillator, typical frequencies ranging from 20–40 kc. These frequencies although not in the broadcast range, are not very far beneath it, and it has been found that, where such a local oscillator is operated in proximity to a broadcast receiver, the oscillator, due to various factors such as the presence of low grade iron in its immediate vicinity, generates and radiates harmonics within the broadcast range. These harmonics interfere with the reception of the broadcast receiver.

Accordingly, up to the present time, no commercial instrument has been manufactured which incorporated in a single unit a radio broadcast receiver and a wire recorder for the radio, said recorder having a high frequency bias oscillator.

Pursuant to the present invention, means is included to minimize the generation of the undesirable high harmonics and the radiation of such harmonics to the broadcast receiver. In general, this is accomplished by electromagnetically shielding the transformer for the high frequency bias oscillator. This shielding reduces the stray-field strength of the transformer so that it is far below the strength of incoming broadcast signals. Moreover, the transformer may be so physically placed with respect to the radio loop antenna, that said antenna is not favorably disposed for reception of signals from the transformer. Furthermore, by electromagnetically shielding the transformer from the iron of the chassis, the transformer is able to generate a substantially true sinusoidal wave form in which high frequency harmonics are of very slight amplitude so that the desirable combination of the weak signal strength of these harmonics and the weak field of the harmonics in the region of the antenna for the radio receiver both prevent noticeable interference of the higher harmonics with the broadcast signals.

Referring now in detail to the drawings, the reference numeral 10 denotes a cabinet for a combination radio wire recorder set 12 embodying my invention. The set includes a conventional broadcast receiver 14 which includes a radio tuner 16 (see Fig. 5), an audio amplifier 18, and a loud speaker 20. The tuning and amplifying elements are mounted on a chassis 22 (Fig. 4) which is secured to the cabinet 10 on the interior thereof. The radio tuner is adjusted to receive various broadcast stations by means of a tuning knob 24 whose position is indicated with the aid of a scale 26 and a moving mark 28, as is conventional.

Figures 4, 5:
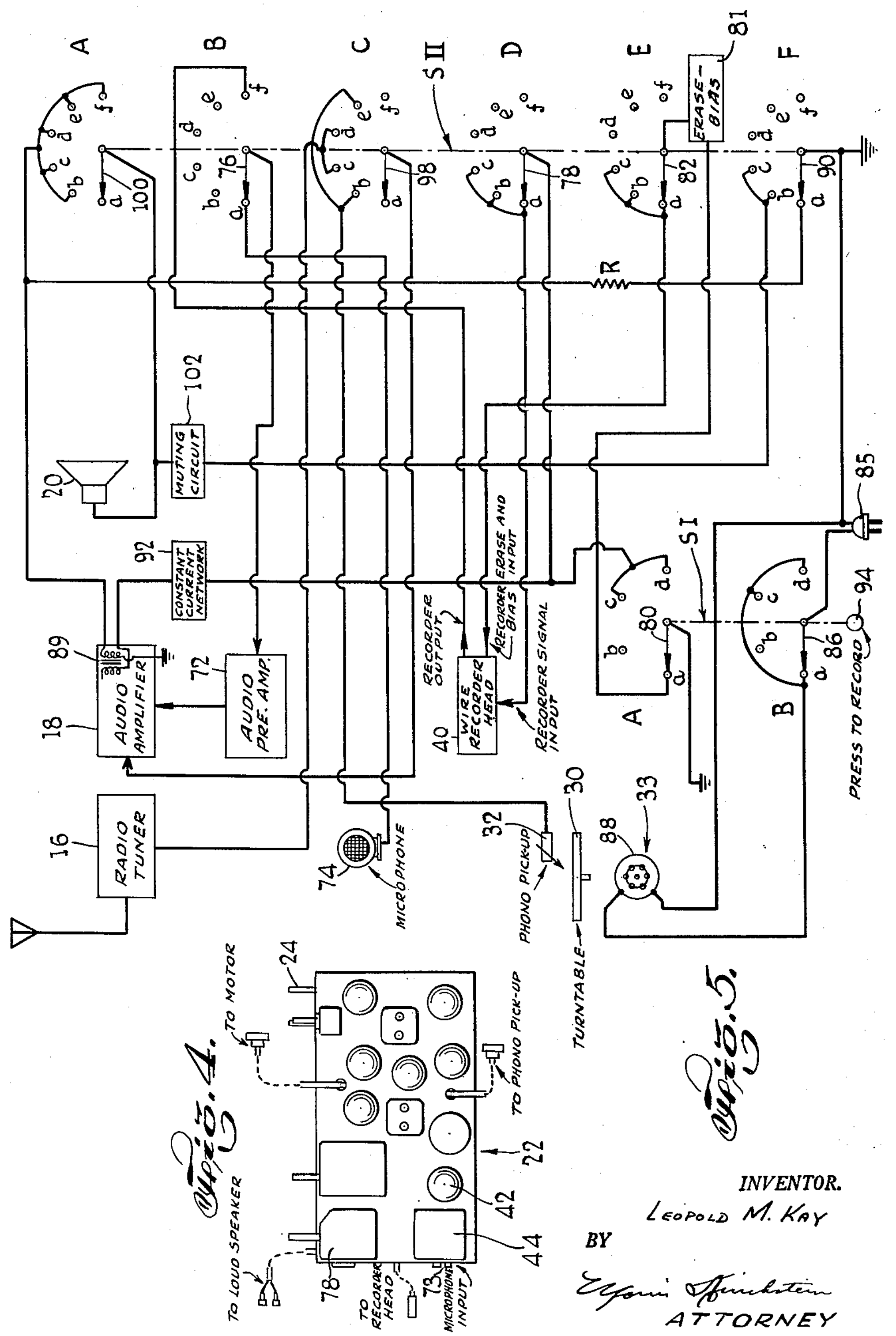
Fig. 4 is a plan view of the radio chassis which includes the bias oscillator.
Fig. 5 is a schematic block diagram illustrating the functional relationship and organization of the different devices which form the radio wire recorder of my invention.

The set also includes a phonograph turntable 30 which is adapted to cooperate with a phonograph pick-up arm 32 of a standard type. The turntable is driven by a motor 33 (Fig. 5). Said turntable has a wire take-up spool 34 mounted to turn with it and receive a magnetizable wire 36 wound off of a supply spool 38.

As the wire passes between the two spools, it travels over a recorder head 40 which may be of conventional construction, the illustrated head being of the type known as a "self-biasing" head.

This head has a magnetizing sound coil which is energized by an audio input signal whereby to magnetize the wire and thereby record the desired sound. The head also has an erasing magnetizing coil over which the wire travels during recording before it reaches the sound coil. This erasing coil is energized by a high frequency current which thus serves to remove any previous magnetization which may be in the wire. A bias coil also is provided in the head immediately adjacent the sound coil, but connected in series with the erasing coil so that as sound is recorded, the wire simultaneously is subjected to a high frequency magnetic field which eliminates hysteresis distortion. The bias field is, of course, considerably weaker than the erasing field.

Figure 3:
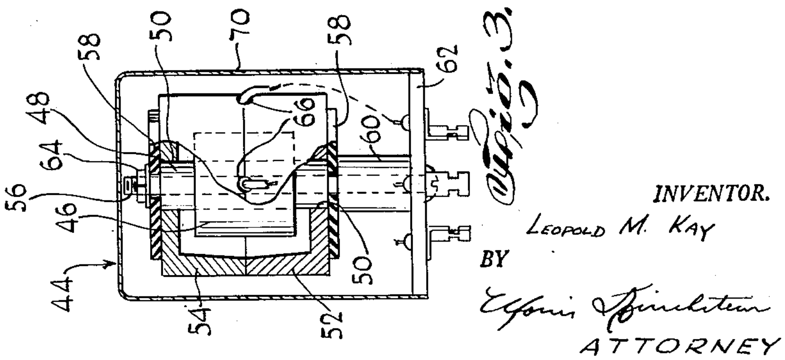
Fig. 3 is an elevational view in partial section of the bias oscillator transformer.

According to the present invention, the erasing and biasing high frequency current is generated by an oscillator of any conventional type, as for instance, a Hartley oscillator. This includes as its principal elements a vacuum tube 42 (Fig. 4) and a transformer 44 (Figs. 3 and 4). The latter comprises a pair of coils 46 wound on a powdered iron core 48 whose ends jut out beyond the ends of the coil and are received snugly in openings 50 formed in the base walls of two cup-shaped pot shells 52, 54. These shells likewise are fabricated from powdered iron and are so shaped that their rims abut one another and are in registration whereby to form a complete enclosure for the coil providing a closed magnetic path of high permeability at the flux densities encountered, thus minimizing the stray magnetic field. It will be appreciated that the shells are of sufficiently large cross-sectional area perpendicular to the flux and are of such quality that they do not approach saturation.

It is pointed out that, inasmuch as the magnetic field of the transformer is concentrated around the coils, the field cannot be distorted by low grade iron members outside the shells to an extent sufficient to enable the oscillator circuit to generate high harmonics of appreciable amplitude. That is to say, by concentrating the field in the walls of shells, there is eliminated the tendency to saturate magnetically low grade iron or steel in the vicinity of the transformer which would result in the generation of high harmonics by the oscillator.

It also is pointed out that concentrating the field around the coil prevents the saturation of low grade magnetic material which otherwise would be in the field of the oscillator tank circuit and which would cause said field to contain high harmonics. It may be observed that the offending metal pieces which, except for the shield, would cause the oscillator to generate high harmonics and would themselves generate high harmonics, may be the steel chassis or steel mounting screws.

The reduction of harmonics caused by nonlinearity of the oscillator tube itself may be accomplished by correctly proportioning the feed back and grid bias voltages in a manner well known in the art. The tank LC ratio should be such that sufficient "fly wheel" effect is present to smooth out the plate current pulses as is standard in oscillator design practice.

The halves of the pot shell and the core are held together by a brass screw 56 which extends through a central opening in the core. The screw also passes through central openings in washers 58 of electrically non-conductive material, such as a phenol formaldehyde condensation product, these washers being disposed above and below the upper and lower shells respectively. Moreover, the screw passes through a wooden plug 60 which holds the pot shell off the transformer base plate 62. The head of the screw is disposed beneath the base plate, and the tip of the screw is threaded to receive a nut 64 serving to clamp the two shell halves between the washers 58. The abutting rims of the shell halves are notched in registry to provide openings in the shell through which transformer leads 66 can be run.

The transformer is mounted with the longitudinal axis of its core 48 offset from the loop antenna 68 for the radio receiver, said antenna being located at the back of the cabinet 10. Moreover, the longitudinal axis of the transformer core is disposed at right angles to the plane of the loop. These arrangements serve to lessen the electromagnetic coupling between the oscillator transformer and the loop.

The transformer is electrostatically shielded by enclosure in a can 70 of non-magnetic material such as aluminum which it will be understood is not essential to the operation of my invention.

The chassis 22 in addition to the radio tuner, audio amplifier, and erasing and bias oscillator, mounts an audio pre-amplifier 72 (Fig. 5) whose function is well known in the art. The chassis is provided with a plug socket 73 which is adapted to receive the prongs of a plug from which lead wires run to a microphone 74.

The cabinet 10 mounts a pair of selector switches 76, 78 hereinafter referred to for convenience as switch I and switch II. It is the function of switch I to control the actuation and direction of movement of the turntable and wire spools 34, 38. In addition, this switch controls an electric circuit for the wire recorder. Switch II functions to control electric circuits for all the elements of the set. Switch I is a four position switch and switch II, a six position switch. Due to the several operations which need to be performed by these switches, said switches may be of multiple deck construction, and by way of example, switch I is illustrated as constituting a two deck switch, and switch II a six deck switch. However, it will be understood by those skilled in the art that although this number of decks for the various switches enables a wiring diagram and schematic block diagram such as Fig. 5 to be most easily understood, in actual practice, less decks may be employed.

The manner in which these two switches are connected is best seen in Fig. 5, and is most simply described by outlining the operation of the set with the switches in various positions.

When switches I and II are in their extreme counterclockwise position, referred to as the "first" position, this being the position illustrated in Fig. 5, the set is in what is known as "record microphone position"; that its to say, the set is in position wherein sound impinging on the microphone will be recorded on the wire 36. The signal from the microphone 74 is connected through arm 76 and contact *a* of B deck of switch II to the audio pre-amplifier. From here, the signal goes to the audio amplifier and, after amplification, through arm 78 and contact *a* of D deck of switch II to the recorder head. At the same time, the bias oscillator 81 is rendered effective by connecting its low potential lead to ground through arm 80 of A deck of switch I and contact *a* of said switch deck. The oscillator output is applied to the recorder head through arm 82 of E deck of switch II and contact *a* of said deck. Switch I also connects an A. C. source of power 85 to arm 86 of B deck of switch I which engages contact *a* of this deck, said contact being connected to the motor field 88 of the turntable motor 33. A conventional mechanism such as a self-jamming idler (not shown), actuated by the shaft at switch I completes the kinematic train from the motor 33 to the turntable and wire pick-up spool 34 so as to rotate these elements at the proper speed and in proper direction to pull the wire 36 past the recording head 40 in a recording or forward direction.

The output of the audio amplifier which is fed to the recording head is derived from the primary of the audio output transformer 89, and in order that a proper load be imposed on the secondary of this coil to permit correct functioning of the audio amplifier, a resistance R is connected across the secondary of said transformer, the speaker being disconnected at A deck of switch II so that no sound is emitted therefrom. Said resistance R has one terminal thereof connected to ground through contact *a* and arm 90 of F deck of switch II. The other terminal of said resistance is connected across the secondary of the audio output transformer.

Mention may be made of the fact that the signal from the audio amplifier to the recorder head, before reaching arm 78 of deck D of switch II passes through a constant current network 92 whereby to obtain better fidelity. This network, it will be seen, always is in circuit when a recording is being made on the wire.

It also should be noted that a safety lock (not shown) may be provided to prevent accidentally throwing switch I into its extreme counterclockwise or first position, wherein the recorder head is rendered operative. Said lock prevents movement of the control shaft of switch I to its first position unless the lock is released by depressing a button 94 which conveniently is located adjacent the handle 96 of switch I.

As will be appreciated from inspection of Fig. 5, the radio tuner 16 is disconnected from the audio amplifier, and the audio amplifier from the loud speaker at decks C and A respectively, when switch II is in its first position.

The second position of switch II is that in which the various arms thereof engage the *b* contacts of the several decks. The cooperating position of switch I is the latter's first position. In these positions of the switches the set is connected to record from a phonograph record on the wire 36. The output signal from the phonograph pickup 32 runs to *b* contact of C deck of switch II and then through arm 98 to the audio amplifier. The secondary of the output transformer of the amplifier is connected to the *b*, *c*, *d*, *e*, and *f* contacts of A deck of switch II so that in the second position of said switch the arm 100 of A deck connects the signal output from the audio amplifier to the loud speaker. In order to keep the sound output of the loud speaker at a low level during the recording of a phonograph disc record, a muting circuit 102 is employed, one terminal of said circuit being connected to the input to the loud speaker, and the other terminal of said circuit running to the *b* and *c* contacts of F deck of switch II. Arm 90 of the F deck therefore connects the other terminal of muting circuit to ground when switch II is in its second position so as to attenuate the speaker signal. It will be observed that resistance R is disconnected in said position inasmuch as the loud speaker is connected. The circuit from the primary of the audio output transformer 89 to the recorder head 40 is the same as in the first position of switch II (see D deck) so that the signal output of the phonograph is impressed on the recorder head. The erasing and biasing current likewise is impressed in the recording head in the same manner as in the first position of switch II (see A deck of switch I and E deck of switch II). The phonograph turntable and wire pickup spool are turned by the motor 33 which is energized thru B deck of switch I in its first position.

In the third position of switch II wherein various arms of said switch engage the *c* contacts of the various decks, the set is connected to record the radio output on the wire recorder. At such time, switch I is in its first position, wherein the various arms engage the *a* contacts of the various decks. In said third position of switch II, the output of the radio tuner 16 is connected to the audio amplifier through *c* contact and arm 98 of the C deck of switch II. The primary of the amplifier output is fed to the constant current network 92 and thence through *c* contact of D deck of switch II to the recorder head. The secondary of the power output transformer is fed to the loud speaker through *c* contact and arm 100 of A deck of switch II. The muting circuit 102 for the loud speaker is rendered effective through *c* contact and arm 90 of F deck of switch II so that the output of the loud speaker is maintained at a low level during recording. As in the second position of switch II the resistance R is disconnected. The erasing and biasing circuit is the same as in the first two positions of switch II. It is in this third position of switch II that the shielding of the transformer 44 is effective to prevent interference with the radio tuner.

In the fourth position of switch II the set is arranged to play the radio only. The corresponding position of switch I is its second position, referred to as the "off" position of said switch, being that in which the various arms thereof engage the *b* contacts of switch I.

In the fourth position of switch II the radio tuner 16 is connected to the audio amplifier 18 through *d* contact of C deck of switch II, the secondary of the output transformer 89 being connected to the loud speaker 20 through *d* contact of A deck of switch II. The muting circuit is cut out inasmuch as the *d* contact of F deck is not electrically connected to said circuit. The recording circuit is opened (see D deck of switch II). In the second position of switch I the erasing and biasing circuits are opened and no power is supplied to the turntable motor (see A and B decks of switch I and E deck of switch II).

In the fifth position of switch II the phonograph is played. For this purpose, in said fifth position the phonograph pick-up 32 is connected to the audio amplifier 18 through *e* contact of C deck of switch II. The secondary of the audio output transformer is connected to the loud speaker 20 through *e* contact of A deck of switch II, the muting circuit 102 being cut out as in the fourth position of switch II. The corresponding setting of switch I is its third or "play" position. The *c* contact of A deck of switch I grounds the output of the constant current network 92 so that the erasing and biasing circuit is cut out and no signal can be impressed on the recorder head. However, the *c* contact of B deck of switch I is connected to the motor 33 so that the motor field will be energized, and the kinematic train is arranged in said third position of switch I in the same manner as in its first position so that the turntable motor will be rotated in the proper direction for playing phonograph disc records.

In the sixth and last position of switch II, wire recordings are played. In said position the output from the recorder head 40 is connected to the audio preamplifier 72 through *f* contact of B deck of switch II and arm 76. The audio preamplifier feeds into the audio amplifier. The secondary of the output transformer 89 for the audio amplifier is connected by *f* contact of A deck of switch II to the loud speaker, the muting circuit being cut out (see F deck of switch II). The output from the erase and bias oscillator is cut out at *f* contact of E deck of switch II. Switch I is turned to its third or "play" position wherein A deck cuts out ground return for the erasing and biasing oscillator and B deck energizes the motor field 88, the kinematic train being arranged to turn the take-up spool in the direction for playing the wire, this being the same direction as that for which the phonograph turntable is rotated to play a disc record.

When it is desired to rewind the wire from the pickup to the supply spool, switch I is turned to its fourth or "rewind" position in which the motor field is energized through arm 86 and *d* contact of B deck. In said position of the switch, the kinematic train is arranged to drive the supply spool in a take-up or rewinding direction. Inasmuch as the *a* contact of A deck of switch I is not connected in circuit, the previous recording cannot be erased while the wire is being rewound. Nor can any signal be impressed on the recorder head since the *d* contact of A deck of switch I grounds the output of constant current network.

It thus will be seen that I have provided a radio wire recorder which achieves the several objects of my invention and is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described my invention I claim as new, and desire to secure by Letters Patent:

1. A radio wire recorder comprising a radio tuner, a loud speaker, a wire recorder, a normally unactuated high frequency bias oscillator, means to actuate said bias oscillator, multi-position switch means, and circuit means for connecting the output of the radio tuner to the loud speaker in one position of the switch means, for connecting the output of the wire recorder to the loud speaker in another position of said switch means, and in a third position of said switch means for rendering said actuating means effective, and for connecting the output of the radio tuner and the output of the high frequency bias oscillator to the wire recorder said oscillator including a transformer and an electro-magnetic shield for said transformer.

2. A radio wire recorder comprising a radio tuner, an audio amplifier, an audio pre-amplifier, a loud speaker, a muting circuit, a microphone, a wire recorder, a high frequency bias oscillator including a transformer and means to electro-magnetically shield said transformer, a phonograph pickup, multi-position switch means, and circuit means for connecting the output of the microphone to the audio pre-amplifier from there to the audio amplifier, and from there to the wire recorder, and for connecting the output of the high frequency bias oscillator to the wire recorder in one position of said switch means, in another position of said switch means for connecting the output of the phonograph pickup to the audio amplifier and from there to the wire recorder, for connecting the output of the high frequency bias oscillator to the wire recorder and for connecting the output of the audio amplifier to the loud speaker and rendering the muting circuit effective, in another position of said switch means for connecting the output of the radio tuner and the output of the high frequency bias oscillator to the wire recorder, and for connecting the output of the radio tuner to the loud speaker while rendering the muting circuit effective, in another position of said switch means for connecting the output of the radio tuner to the audio amplifier and from there to the loud speaker while rendering the muting circuit ineffective, in another position of said switch means for connecting the output of the phonograph pickup to the audio amplifier and from there to the loud speaker while rendering the muting circuit ineffective, and in another position of said switch means for connecting the output of the wire recorder to the audio pre-amplifier from there to the audio amplifier, and from there to the loud speaker while rendering the muting circuit ineffective.

3. A radio wire recorder comprising as a single unit a radio tuner, an audio amplifier, a loud speaker, a wire recorder, a high frequency bias oscillator, multi-position switch means, and circuit means for connecting the output of the radio tuner to the loud speaker in one position of the switch means, for connecting the output of the wire recorder to the loud speaker in another position of said switch means, and for connecting the output of the radio tuner and the output of the high frequency bias oscillator to the wire recorder in a third position of said switch means, said oscillator including a transformer which is electro-magnetically shielded, both the shield and the transformer core being of powdered iron and providing a magnetic path of high permeability.

4. A radio wire recorder comprising a radio tuner, a loud speaker, a wire recorder, a normally unactuated high frequency bias oscillator, means to actuate said bias oscillator, a multi-position switch means, and circuit means for connecting the output of the radio tuner to the loud speaker in one position of the switch means, for connecting the output of the wire recorder to the loud speaker in another position of said switch means, and in a third position of said switch means for rendering said actuating means effective and for connecting the output of the radio tuner and the output of the high frequency bias oscillator to the wire recorder, said oscillator including a transformer and an electro-magnetic shield for said transformer, said transformer having a powdered iron core, said electro-magnetic shield comprising a two-part powdered iron shell having openings therein to accommodate the ends of the core whereby a closed magnetic path of high permeability is afforded for the transformer flux.

5. A radio wire recorder comprising a radio tuner, a loud speaker, a wire recorder, a normally unactuated high frequency bias oscillator, means to actuate said bias oscillator, a multi-position switch means, and circuit means for connecting the output of the radio tuner to the loud speaker in one position of the switch means, for connecting the output of the wire recorder to the loud speaker in another position of said switch means, and in a third position of said switch means for rendering said actuating means effective and for connecting the output of the radio tuner and the output of the high frequency bias oscillator to the wire recorder, said oscillator including a transformer and an electro-magnetic shield for said transformer, said transformer having a powdered iron core, said electro-magnetic shield comprising a two-part powdered iron shell having openings therein to accommodate the ends of the core whereby a closed magnetic path of high permeability is afforded for the transformer flux, the shell and core being of such quality and of such cross sectional area perpendicular to the flux that said magnetic path does not approach saturation in operation.

LEOPOLD M. KAY.

REFERENCES CITED

The following references are of record in the file of this patent:

UNITED STATES PATENTS

| Number | Name | Date |
|---|---|---|
| 1,765,443 | Peterson | June 24, 1930 |
| 1,821,496 | Cohen | Sept. 1, 1931 |
| 1,951,175 | Sinnett | Mar. 13, 1934 |
| 1,952,809 | Kuchenmeister | Mar. 27, 1934 |
| 1,974,904 | Von Arco | Sept. 25, 1934 |
| 2,026,060 | Pratt | Dec. 31, 1935 |
| 2,032,190 | Thomas | Jan. 25, 1936 |
| 2,053,760 | Bedeschi | Sept. 8, 1936 |
| 2,242,983 | Thompson | May 20, 1941 |
| 2,250,371 | Grimes | July 22, 1941 |
| 2,279,018 | Wolfe | Apr. 7, 1942 |
| 2,351,004 | Camras | June 13, 1944 |
| 2,388,848 | Howe | Nov. 13, 1945 |
| 2,407,916 | Berg | Sept. 17, 1946 |

OTHER REFERENCES

Elements of Radio, 1943, by A. Marcus and W. Marcus, published by Prentice-Hall Inc., edited R. E. Horton, pp. 123, 124, 192-195.

Radio Engineering, 1947, by Terman, pages 36-38.

TM-11-2576 War Department Technical Manual, Feb. 19, 1945.

RCA Receiving tube Manual Series RC-14, 1940, page 39, pub. by RCA Mfg. Co.